(12) United States Patent
Mølgaard

(10) Patent No.: US 7,856,603 B2
(45) Date of Patent: Dec. 21, 2010

(54) GRAPHICAL USER INTERFACE

(76) Inventor: John Mølgaard, Sortemosen, DK-3450 Allerød (DK)

( * ) Notice: Subject to any disclaimer, the term of this patent is extended or adjusted under 35 U.S.C. 154(b) by 1075 days.

(21) Appl. No.: 10/344,747

(22) PCT Filed: Jul. 16, 2001

(86) PCT No.: PCT/DK01/00501

§ 371 (c)(1),
(2), (4) Date: Jul. 30, 2003

(87) PCT Pub. No.: WO02/14996

PCT Pub. Date: Feb. 21, 2002

(65) Prior Publication Data

US 2004/0021696 A1    Feb. 5, 2004

(30) Foreign Application Priority Data

Aug. 17, 2000  (DK) .................... 2000 01225

(51) Int. Cl.
G06F 3/048 (2006.01)
G06F 3/01 (2006.01)
G06F 3/14 (2006.01)
G09G 5/00 (2006.01)

(52) U.S. Cl. .............. 715/835; 715/702; 715/810; 715/840; 715/856; 715/864; 345/156

(58) Field of Classification Search .......... 715/823, 715/835, 864, 840, 856, 704, 861; 345/156
See application file for complete search history.

(56) References Cited

U.S. PATENT DOCUMENTS 4,910,697 A   3/1990  Lapeyre
5,008,847 A   4/1991  Lapeyre
5,058,046 A   10/1991 Lapeyre
5,105,375 A   4/1992  Lapeyre (Continued)

FOREIGN PATENT DOCUMENTS

EP    0 889 388    1/1999

(Continued)

OTHER PUBLICATIONS

Isokoski, Poika, A Minimal Device-Independent Text Input Method, Oct. 11, 1999.*

Primary Examiner—Tadeese Hailu
Assistant Examiner—Nicholas S Ulrich
(74) Attorney, Agent, or Firm—Volentine & Whitt, P.L.L.C.

(57) ABSTRACT

An apparatus for selection of characters to be displayed on a display screen. Has input actuators with associated fields containing graphical symbols representing the characters. The user is guided during selection of a character via the display. The selection procedure is sufficiently simple to allow a user to memorise the steps needed in order to select a specific character. Uses a limited number of actuators, and a character is selected using a sequence of actuations. Actuations may e.g. be keystrokes or movement by tactile pointing means on a touch sensitive device. Preferably, a character is selected by drawing one or two linear segments on a touch sensitive device. The displayed graphical symbols are preferably rearranged upon actuation. Suitable for use in electronic devices, in particular hand held devices having a small display screen, such as communication equipment, such as portable phones, e.g. mobile phones, or computers.

24 Claims, 6 Drawing Sheets

U.S. PATENT DOCUMENTS

| | | | |
|---|---|---|---|
| 5,119,079 A * | 6/1992 | Hube et al. | 715/823 |
| 5,457,454 A | 10/1995 | Sugano | |
| 5,805,167 A * | 9/1998 | van Cruyningen | 715/808 |
| 6,016,142 A | 1/2000 | Chang et al. | |
| 6,037,942 A * | 3/2000 | Millington | 715/835 |
| 6,137,487 A * | 10/2000 | Mantha | 715/767 |
| 6,271,835 B1 * | 8/2001 | Hoeksma | 345/168 |
| 6,628,285 B1 * | 9/2003 | Abeyta et al. | 345/441 |

FOREIGN PATENT DOCUMENTS

| | | |
|---|---|---|
| EP | 0 913 977 | 5/1999 |
| EP | 1 130 502 | 2/2000 |
| EP | 1 067 784 | 1/2001 |
| GB | 2 332 293 | 6/1999 |
| GB | 2 337 349 | 11/1999 |
| GB | 2 344 905 | 6/2000 |
| GB | 2344905 A * | 6/2000 |
| WO | WO 99/44212 | 9/1999 |
| WO | WO 99/46563 | 9/1999 |
| WO | WO 00/41061 | 7/2000 |

* cited by examiner

GRAPHICAL USER INTERFACE

FIELD OF THE INVENTION

The present invention relates to a graphical user interface with a display screen for displaying graphical symbols in fields that may be selected by a user for input to an apparatus. More specifically, the present invention relates to a graphical user interface allowing a large number of symbols to be selected for input to an apparatus utilizing a small number of fields, in particular for use in connection with communication equipment, such as portable phones and computers, e.g. with a WAP or a SMS interface.

BACKGROUND OF THE INVENTION

The development of mobile phones and portable phones and computers with an interface operating according to the Wireless Application Protocol (WAP) has increased the need for a user interface allowing a large number of options to be displayed on a small screen for selection, e.g., using a keyboard with a small number of keys.

It is well known to provide portable phones and computers with a small display screen and a small keyboard, e.g., with a navigation key to move a cursor on the display screen, so that a user is able to input data to the equipment and to select functions to be performed by the equipment. A large variety of approaches are known facilitating selection of a large number of alphanumeric characters and functions using a small keyboard together with a small screen.

For example in U.S. Pat. No. 6,016,142, a user interface is disclosed facilitating selection of a large number of characters with a 4 by 3 numeric keyboard well-known from telephones. The selectable characters are displayed on a screen in three 3 by 3 matrices located adjacent to each other. The keys ".", "0" and "#" are used for navigation between the three matrices, activation of the "." key causing a new alphabet to be displayed in the three matrices.

U.S. Pat. No. 5,457,454 discloses a user interface comprising a virtual keyboard. A keyboard is drawn on a screen and keys are activated by positioning a cursor at the key to be activated, e.g. with a mouse, and clicking the mouse. Characters that require more than one key to be activated in a physical keyboard are activated by positioning the cursor at the key to be activated and then drawing the key in a certain direction.

In U.S. Pat. No. 4,910,697, a keyboard with 16 keys is disclosed, wherein numerical digits can be selected with a single key activation while alphabetic characters and functions can be selected with a sequence of two key activations.

In U.S. Pat. No. 5,008,847, a user interface of a CAD system is disclosed, having a virtual keyboard with keys that are selected with a mouse controlled cursor. As in U.S. Pat. No. 4,910,697, numerical digits can be selected with a single key activation while alphabetic characters and functions can be selected with a sequence of two key activations.

EP 1 067 784 discloses a method of selecting alphanumeric characters via a remote control. A first depression of one of the buttons of the remote control causes the display on a screen of a number of segments, each segment including a plurality of letters, numbers and/or characters and an identifying number or character for each segment. The depression of the appropriate number on the remote control for the selected segment, causes the visual display to change to show the characters of the selected segment, each character positioned in a sub-segment. Subsequent depression of the appropriate number on the remote control causes the selection of the corresponding character.

EP 0 889 388 discloses a data input interface. A subset of characters is initially displayed on a touch sensor display. Respective subsets of the remaining characters of the alphabet are associated with the displayed characters. The user, having a particular character in mind, selects the displayed character associated with the subset containing the particular character. That subset is then displayed, and the user selects the desired character.

GB 2 332 293 discloses an input device for inputting instructions or data into an apparatus having a display. The display displays at least one menu item as a plurality of subsequentially selectable submenu items. Responsive to the selection of a submenu item, the display indicates the selectability of the submenu items. A selector can be used for the subsequent selection of the submenu items and data or instructions are input based on a selected menu item of sub-menu item.

SUMMARY OF THE INVENTION

Although many attempts have been made to facilitate user selection of an input among a large number of alphanumeric characters and a large variety of functions on a small display screen with a limited set of display fields, there is still a need for an efficient user interface providing a well-arranged display of available selections that is easy to grasp and manage by a user. The user interface must be easy to operate after a short learning period, yet able to perform all the necessary single and combined data entries which will be required in a modern communication equipment, such as phones with a WAP interface, a SMS interface, etc. Furthermore, there is a need for a user interface which trains the user during use, i.e. which does not require a separate learning facility in order to teach the user how to use the interface and become an expert user.

According to a first aspect of the present invention these and other objects are fulfilled by a method of inputting data to an apparatus with an input device comprising a selector for selection of characters and having input actuators with associated fields containing first graphical symbols, at least one of the first graphical symbols indicating a first set of alphabetic characters in alphabetic order, the apparatus further comprising a display screen, a symbol generator for displaying the fields containing the first set of graphical symbols in an arrangement on the display screen, and a controller that is operatively connected to the symbol generator and the selector, the method comprising the steps of:

actuation of an input actuator with an associated field containing a symbol indicating a first set of alphabetic characters in alphabetic order, and allocation of each of the alphabetic characters in the first set of alphabetic characters to a specific input actuator so that actuation of that input actuator results in selection of the allocated alphabetic character, the steps being performed in such a way that a user is guided by the apparatus during selection of an alphabetic character, and in such a way that selection of a specific alphabetic character is sufficiently simple to allow a user to memorise the selection procedure.

According to a second aspect of the invention the above-mentioned and other objects are fulfilled by an apparatus with an input device comprising a selector for selection of characters and having input actuators with associated fields containing first graphical symbols, characterised in that
the apparatus further comprises
a display screen,
a symbol generator for displaying the fields containing the first set of graphical symbols in an arrangement on the display screen, and
a controller that is operatively connected to the symbol generator and the selector,
and in that at least one of the first graphical symbols indicates a first set of alphabetic characters in alphabetic order and in that actuation of the corresponding input actuator results in allocation of each of the alphabetic characters in the first set of alphabetic characters to a specific input actuator so that actuation of that input actuator results in selection of the allocated alphabetic character, and in that the apparatus comprises means for guiding a user during selection of an alphabetic character, and in that selection of specific alphabetic characters is sufficiently simple to allow a user to memorise the selection procedure.

For example, the selector may comprise a keyboard with keys constituting the input actuators. Further, the first graphical symbols may be printed on the respective keys.

The user is preferably guided during selection of an alphabetic character by means of the display, preferably by displaying a small number of well-arranged symbols or characters on the display in such a way that it is easy to grasp which actuator should be actuated in order to eventually reach a desired character. On the other hand, the system is sufficiently simple that a skilled user can memorise the selection procedures for at least the characters which are most frequently used. This may, e.g., be achieved by providing an apparatus in which a small number of operations is needed in order to select each character, the operations being easy to memorise. Such operations may, e.g., be a combination of a few strokes on a keyboard, a combination of a few actuations on a touch sensitive device, etc.

The apparatus may further comprise a sound generator for generation of a specific sound upon actuation of a corresponding actuator to provide audio feedback to the user of the apparatus of the actual actuation. The sound generator may be a sound transducer, such as a loud speaker, a piezoelectric transducer, etc. The specific sound may be a specific tone, a sequence of specific tones, a specific chord, a sequence of specific chords, etc., that is associated with actuation of a specific actuator, such as movement of a moving cursor in a specific direction as will be further described later.

The controller may be adapted to control the symbol generator to display a second set of graphical symbols in the fields in response to actuation of an actuator with an associated field with a symbol that indicates a first set of alphabetic characters in alphabetic order, the second set of graphical symbols comprising graphical symbols corresponding to the respective characters of the first set of alphabetic characters.

As will be understood from the following discussion, these features permit an extremely simple and safe, yet very effective and advanced, operation of the user interface.

It is an important advantage of the present invention that display of selectable symbols indicating a set of alphabetic characters in alphabetic order provides a clear indication of the options that will be available to the user upon activation of the symbol in question. Hereby very little support from the memory of the user is required. However, the operations needed in order to select a specific character is preferably easy to memorise for the skilled user.

It is a further advantage of the present invention that it is possible to type any character 25 which is immediately available from a conventional keyboard of a computer or typewriter. Furthermore, special characters, such as "524 ", "ø", "å", "£", space, etc., as well as strings of characters, such as ". (space)" "carriage return, line feed", etc., may be selected just as easily as any other character. Thus, according to the present invention a smaller number of operations is needed in order to select a desired character, as compared to prior art methods.

The display screen may be any screen that is suitable for displaying alphanumeric characters and other symbols in an arrangement, such as a matrix arrangement. For example, the display screen may be a LCD screen, a CRT, a plasma screen, a TFT screen, etc., and further the screen may be touch sensitive.

The graphical symbols may be alphanumeric characters, Greek characters, Cyrillic characters, Japanese characters, Chinese characters, mathematical symbols and operators, icons, etc. Further, the graphical symbols may be constituted by any sequence of such characters and combinations of such characters, e.g. "a-g", "h-n", "o-u", etc.

A selectable graphical symbol may be displayed in a distinct field that may be graphically distinguished from its surroundings by means of, e.g., a boundary, a background colour, a background pattern, etc., or any combination of such graphical distinguishing features.

The selector may comprise a touch sensitive device, such as a touch sensitive screen, in which case a specific directional movement on said touch sensitive device by a tactile pointing means corresponds to selection of a specific actuator.

The tactile pointing means may be a pen or a stylus, or it may simply be a finger. In this embodiment a character may be selected by a couple of simple strokes, preferably by drawing a few substantially linear segments on the touch sensitive device.

The apparatus may be a hand held apparatus, such as a portable phone or computer, in which case the touch sensitive device may be positioned on a surface of the apparatus being opposite the surface exhibiting the display. In case the apparatus is a portable phone, the touch sensitive device may positioned on the back side of the phone, i.e. the side opposite to the side where the display and the keys are positioned. Thus, a user may easily select characters to be displayed on the display while holding the phone in his/her hand, using a finger of the hand holding the phone, while at the same time viewing the display. This applies in a similar way to other hand held apparatuses.

Alternatively, the selector may comprise a number of keys corresponding to the actuators, in which case actuation of a specific key corresponds to actuation of the corresponding actuator, and said keys are positioned on a surface of the apparatus being opposite the surface exhibiting the display. The remarks set forth above apply equally in this case.

One or more of the second symbols may indicate a second set of alphabetic characters in alphabetic order and the controller may be further adapted to control the symbol generator to display graphical symbols corresponding to the characters of the second set of alphabetic characters in response to the selection of such a symbol.

The second set of alphabetic characters may be a case shifted version of the first set of alphabetic characters of the selected first symbol. For example, if the selected first set of characters is "o-u" (lower case), one of the second symbols may be "O-U" (upper case). Preferably the second symbol "O-U" is positioned at the same relative position in the matrix arrangement as the first symbol "o-u" for further ease of operation.

The displayed symbols may be arranged on the display screen in any suitable arrangement providing a well-arranged and clear display of options available to the user. In this manner the user is guided during the selection of a character in an efficient and easy to grasp manner. Preferably, the displayed symbols are arranged in a matrix arrangement, e.g., exhibiting rows and columns. It has been found that a 3 by 3 matrix arrangement provides a clear display of options that is well-suited for the display screen of a portable or mobile phone.

The selector may comprise a keyboard with keys having relative positions in the keyboard that correspond to the relative positions of displayed symbols in the arrangement on the display screen. In this case, each of the displayed fields containing a selectable symbol constitutes an input actuator which is activated by activation of the key with the corresponding position in the keyboard.

The selector may comprise a touch sensitive device, such as a touch sensitive display screen or plate, allowing a graphical symbol to be selected by any kind of external interaction with the field containing the symbol. The selection is suitably performed using a tactile pointing means, such as simply a finger or pointer touching and/or pressing against at least part of the area occupied by the field containing the symbol to be selected. Thus, each of the displayed fields containing a selectable symbol constitutes an input actuator which is activated by tactile pointing means.

Alternatively, the selector may comprise a moveable cursor that is displayed on the display screen, a cursor controller for manually controlling the position of the cursor on the display screen, and a click actuator for selection of the symbol at the current cursor position. The cursor controller may be a mouse, a track ball, a digitising pen, a light pen operating directly on the display screen, a keyboard, a part of a keyboard, a touch sensitive plate, etc. The click actuator may be a switch positioned on the mouse, track ball, digitising pen, light pen, keyboard, etc. When the cursor controller is a touch sensitive plate, a tactile pointing means, such as simply a finger, touching and/or lightly pressing against the touch sensitive plate is used to move the cursor on the display screen by moving the pointing means in the direction of desired cursor movement. In this case a click actuator is not necessary since the selection of a character may be performed by simply interrupting the connection between the tactile pointing means and the touch sensitive plate, i.e. by simply lifting the tactile pointing means. Alternatively to displaying the cursor on the display, a line segment connecting a centre point and the current cursor position may be displayed. Additionally, one or more of the previously drawn line segments may be displayed, so as to display the line segments corresponding to the character which is currently being selected. Thus, the line segments shown when a character has been selected corresponds to the line segments which it is necessary to draw in order to select that character again. This helps the user to acquire expert skills since it visualises the typing process.

Alternatively, the selector may comprise any combination of the above, e.g. a keyboard as well as a touch sensitive device. Thus, a user may choose whether he/she wishes to use the keyboard or the touch sensitive device for the selection procedure. When the user is in a 'relaxed' environment, e.g. at home, at the desk in the office, etc., he/she may choose the touch sensitive device since this may be quicker. When the user is in a more 'disturbing' environment, such as a train, a bus or in another environment in which vibrations or other disturbances makes it difficult to use the touch sensitive device in a sufficiently accurate manner, the user may choose to use the keyboard instead in order to minimise the errors during selection of characters. Furthermore, it may be desirable to use the keyboard rather than the touch sensitive device in case the user is wearing gloves.

Selection of an input to the apparatus is preferably performed by positioning the cursor within the boundary of a specific symbol, e.g. a specific character, and actuating the click actuator. When a touch sensitive plate is used, a symbol is selected for input to the apparatus by, e.g., increasing the pressure against the touch sensitive plate, decreasing the pressure, or completely removing the pressure, the click actuator being constituted by the area of the touch sensitive plate receiving the increased/decreased/removed pressure. Thus, each of the displayed fields containing a symbol selectable for input constitutes an input actuator which is activated by positioning a cursor in the respective field and actuating the click actuator.

Preferably, symbols that upon selection result in display of fields containing a new set of symbols are selected simply by positioning of the cursor within the boundaries of the respective fields. More preferred, such symbols are selected by positioning the cursor within a part of the area occupied by the respective field of the symbol to be selected. For example, in a 3 by 3 matrix of fields containing symbols, when a new image of fields with symbols is displayed, the cursor is typically positioned at the centre field. A new symbol may be selected by moving the cursor outside the boundaries of an octagon that is larger than and covers the centre field before selection is enabled. Hereby, selection of fields positioned at the corners of the 3 by 3 matrix is facilitated. Likewise, if the cursor is positioned at a field with a symbol that may be selected with actuation of the click actuator, i.e. a field with an alphanumeric character, and the operator of the apparatus does not want to select that symbol, a new symbol may be selected by moving the cursor outside the boundaries of an octagon that is larger than and covers the current field. Thus, when the cursor is positioned within the boundaries of a field with a symbol that desirably is not selected, another symbol may be selected by moving the cursor outside a polygon, e.g. an octagon, that is greater than and covers the field currently containing the cursor. Hereby, a hysteresis is provided that makes selection easier to perform. The polygon need not be a regular polygon, for example if the fields are rectangular, the polygon preferably has a height to width ratio that corresponds to the height to width ratio of a field.

Alternatively, the boundaries for defining the selection area need not form a polygon. Other shapes which allow easy discrimination are also feasible. Thus, the shape could, e.g., be such that the apparent angular opening of each selection possibility is similar. The boundaries may, e.g., follow a parabolic curve. Furthermore, in order to ease selection, the scaling, e.g. the movement of the tactile pointing means and the movement of the cursor on the display, might be anisotropic. Typically, the x-axis may be scaled between 1.4 and 1.6 times while the y-axis is not scaled, thus mapping a square on the touch sensitive device into a rectangular shape on the display area. This makes it easier for the user to discriminate by pointing in different directions with the finger.

In the field of computers, it is well known to use context sensitive menus that are activated by actuation of a click actuator, such as a click of the right button on a mouse. Upon activation, a menu that is related to the actual user context is displayed. Likewise, the display of the apparatus according to the present invention may be used for a specific purpose, such as display of a string of previously selected characters that have been input to the apparatus; until actuation of a specific input actuator, such as touching of a touch sensitive plate or display, activation of a cursor controller, etc. Upon such actuation the first set of graphical symbols is displayed in the display. When a new character has been selected, as previously described, the new character is appended to the string of previously selected characters and the updated string is displayed. Thus, the present invention has the inherent capability to allow use of the display in a manner alternating between the text being written and the means for inputting new characters, and the alternation may be performed by the actuation of a specific actuator, similar to the manner in which context sensitive menus are normally used in the field of computers.

The cursor controller may comprise a key for movement of the cursor one step in a specific direction in the matrix arrangement. For example, the cursor controller may comprise eight separate keys for moving the cursor one step to the "east", "south-east", "south", "south-west", "west", "northwest", "north", and "north-east" respectively in the matrix arrangement. If the keys used are designated numeric values as well, then these values might be used to indicate the direction, e.g. if a numeric keypad arrangement is used with the numbers 1-9, then direction "1" might be the same as "northwest", the direction "2" might be the same as "north", etc. The key "5", in this embodiment, does not correspond to any direction, but might still be used as an activation means. Using such a keyboard facilitates memorising of the directions by using the numeric values. Thus, it might be easier to accomplish 'expert skills' using this embodiment. Alternatively, the cursor controller may comprise a key having a plurality of pressure sensitive regions for individual selection of the desired direction of cursor movement.

Upon selection of a specific symbol from the first set of graphical symbols, a second set of symbols may be displayed in an arrangement that is similar to the arrangement of the first set of symbols. The cursor may automatically be re-positioned at the centre of the arrangement, or the cursor may be maintained at the same relative position in the arrangement of the displayed set of graphical symbols as the position of the selected symbol in the arrangement of the previously displayed set of symbols.

At start-up, the input actuators are associated with fields containing first graphical symbols. The fields may for example be displayed on a display screen. Upon selection of symbols new graphical symbols are allocated to the input actuators as for example displayed on the display screen. The apparatus may comprise an input actuator for re-allocating the fields containing the first graphical symbols to the respective input actuators, e.g. thereby displaying the start-up image on the display again. This allows the user to abandon previous selections without inputting data to the apparatus.

Likewise, at least three consecutive actuations of one of the input actuators with associated fields containing first graphical symbols may result in re-allocation of the fields containing the first graphical symbols to the respective input actuators. Thus, in the example with a display, e.g., three or four consecutive selections of the same actuator leads to display of the start-up image. Again this allows the user to browse through the layers of selections and abandon previous selections without inputting data to the apparatus.

It is preferred that upon selection of an individual character, the fields containing the first graphical symbols are re-allocated to the respective input actuators. Thus, in the exemplary embodiment with a display, the start-up image is displayed upon selection of a character for input to the apparatus.

At least one of the fields containing graphical symbols and associated with respective input actuators may remain unchanged upon activation of a specific input actuator. For example, as further described with reference to FIGS. 4a-4c, the input actuators may function as numerical keys during inputting of a decimal number to the keyboard, or specific input actuators may function as navigation (i.e. arrow) keys for a cursor during movement of the cursor.

The apparatus may further comprise an input actuator for switching between a first graphical symbol and a second graphical symbol in a field. For example, as further described below with reference to FIGS. 4a-4c, an input actuator may cause shifting between upper and lower case symbols displayed in the fields.

A field may contain a string of characters, such as "point, space", for selection by actuation of the corresponding actuator.

Further, a field may contain a string of control characters, such as "carriage return, line feed" for selection by actuation of the corresponding actuator.

The selected characters may be appended successively in a string of characters that are input to the apparatus, and the string of selected characters may be displayed on the display, e.g. in a specific area of the display. Alternatively, the string may be displayed in an area of the display also used for display of the fields associated with input actuators. In this case, the string is displayed upon selection of a character. The fields may then be displayed again upon activation of an input actuator. Thus, the display may alternate between displaying the string of selected characters and the fields containing graphical symbols. This is very desirable when using small apparatuses, such as mobile phones, portable computers etc., where only a limited amount of space is available for display purposes. In this case the display is normally relatively small, and it is a great advantage that the display area is reused.

An edit cursor may be provided within the string of selected characters, and an input actuator may further be provided with an associated field containing a symbol of a cursor control character for controlling the positioning of the edit cursor in the string of selected characters by actuation of the input actuator. If the input device of the apparatus comprising a pointing device, the edit cursor may be directly controlled by the pointing device. Thus, if a pointing device, such as a touch sensitive plate, is used for input, the edit cursor might be controlled directly such that text can be added or deleted at the position of the edit cursor.

The set of characters may preferably be specifically tailored to suit the geographic area in which the apparatus is intended for use. Thus, it can be adapted to a specific national set of characters in order to avoid frequent use of accents. Thus, when the user is German it should be possible to write the letters β, ä, ö, and ü directly. Similarly, if the user is Danish, it should be possible to write the letters æ, ø, and å directly, etc.

It is seen that in an embodiment of the present invention comprising a cursor and a cursor controller, a specific symbol, such as an alphabetic character, is selected by drawing a graphical sign constituted by one or two linear segments with the cursor. Thus, a user may enter words and numbers by drawing simple graphical signs on the touch sensitive device in a simple handwriting way. This will enable the user to quickly learn how to enter specific symbols without referring to the displayed symbols whereby an extremely efficient and easy to learn user interface is provided. In embodiments comprising a sound generator, a specific sound, such as a specific tone, may be generated for each linear segment drawn by the cursor. For example, a first tone may be generated upon drawing a vertical line to the north, a second sound may be generated upon drawing a horizontal line to the east, etc. Thus, in a 3 by 3 matrix, each selection of a symbol for input to the apparatus results in generation of a unique sound signature, such as a sequence of two or three tones.

The invention is well adapted for use in communication equipment, e.g. with a WAP interface, equipped with a small screen, such as a telephone, such as a mobile phone, a portable phone, etc., a remote controller, e.g. for video or audio equipment, or for other house appliances, a portable computer, a portable electronic calendar, etc.

The invention may also be advantageously applied in systems with user interfaces incorporating a large display screen or a large keyboard to adapt the system for use by a disabled person who can only operate a small part of the keyboard or use a small part of the display screen, or who needs a crude resolution on the screen due to visual impairment.

Further, the invention may also be advantageously applied in systems with user interfaces that are adapted for use by disabled users, for example systems with pointing plates, or pointers that are moved by the head or a foot, etc.

Further, the invention may be used as a communication means for blind people. Because it is very simple to learn to enter characters by means of a few strokes by a tactile pointing means on a touch sensitive device or by means of a few simple keyboard operations, blind people could easily acquire the necessary skills, and, thus, be able to type quickly using the invention. Furthermore, an audio feedback would in this case be very useful since this would provide the user with the possibility of checking whether errors occur during the typing. The present invention might also constitute a new means for reading as an alternative to the Braille alphabet. The characters may basically be formed by one or two connected vector(s) which might be implemented in cuneiform or using a dot for the starting point on the line which might be sensed similar to Braille.

According to another aspect of the invention there is provided an apparatus with an input device comprising a selector for selection of characters and having input actuators with associated fields containing graphical symbols, the apparatus further comprising a display screen and a symbol generator for displaying the fields containing the first set of graphical symbols in an arrangement on the display screen characterised in that the display is positioned on a first surface of the apparatus, and the selector is positioned on a second surface of the apparatus, said second surface being arranged opposite said first surface.

Thus, according to this aspect of the invention, the display and the selector are positioned on opposite surfaces of the apparatus, e.g. a 'front surface' and a 'back surface' of the apparatus, respectively.

The selector may comprise a touch sensitive device, such as a touch sensitive display and/or a number of keys, e.g. arranged in a keyboard.

In ordinary small electronic devices, such as mobile phones, WAP phones, palmtop computers, pocket calculators and/or remote control units for electronic appliances, the selector, i.e. the touch sensitive device and/or the keys, is often organised below the display on the front of the device. Therefore, the device has to be large enough to accommodate a display as well as a selector on one side of the device. Alternatively, the display and/or the selector is/are made relatively small in order to make the whole device smaller. According to the present invention, however, the display and the selector are positioned on opposite surfaces of the apparatus. Therefore the apparatus may be made smaller without sacrificing the size of either the display or the selector. Alternatively, the display and/or the selector may be made larger without increasing the overall size of the apparatus.

It is a great advantage that the finger of the person operating the apparatus does not obscure the display or the keys labels since this makes it more clear which key will be selected by a certain operation, thus minimising the risk of erroneous selections or operations.

An apparatus according to this aspect of the invention is very easily and naturally operated by one hand since the operator can easily operate the selector positioned on the 'back surface' of the apparatus while looking at the display positioned on the 'front surface' of the apparatus.

The display preferably shows the selection possibilities to the user, e.g. in a matrix arrangement corresponding to the selector on the opposite side. Thus, the display operates as labelling for the actuators, e.g. keys.

A cursor may be displayed on the display, said cursor indicating the operations performed by means of the selector.

In case the selector comprises a touch sensitive device, it may be operated using a finger for pointing while the cursor shows the current position of the finger on the display. When the cursor is pointing at a certain key label this may be selected, e.g. by pressing harder or by removing the finger from the touch sensitive device.

At least the display and the selector may be made from a transparent material. Preferably, any components etc. which might be positioned between the display and the selector is also made from a transparent material, thus making the apparatus transparent, at least in a region containing the display and the selector. Thus, the operator can simultaneously look at the display and the movements of his/her finger on the selector.

The apparatus is preferably adapted for use in a hand held device, such as a mobile phone or a remote controller, e.g. a remote controller for audio or video equipment.

I may be possible to tailor the apparatus 'on the fly' for different applications, e.g. the TV loads the programme for a remote controller into a mobile phone, e.g. using wireless technology similar to the technology used when browsing the Internet on a computer. Thus, the mobile phone may be used as remote controller.

BRIEF DESCRIPTION OF THE DRAWINGS

The invention will now be described in greater detail with reference to the drawings, in which.

DETAILED DESCRIPTION OF PREFERRED EMBODIMENTS

Figure 1:
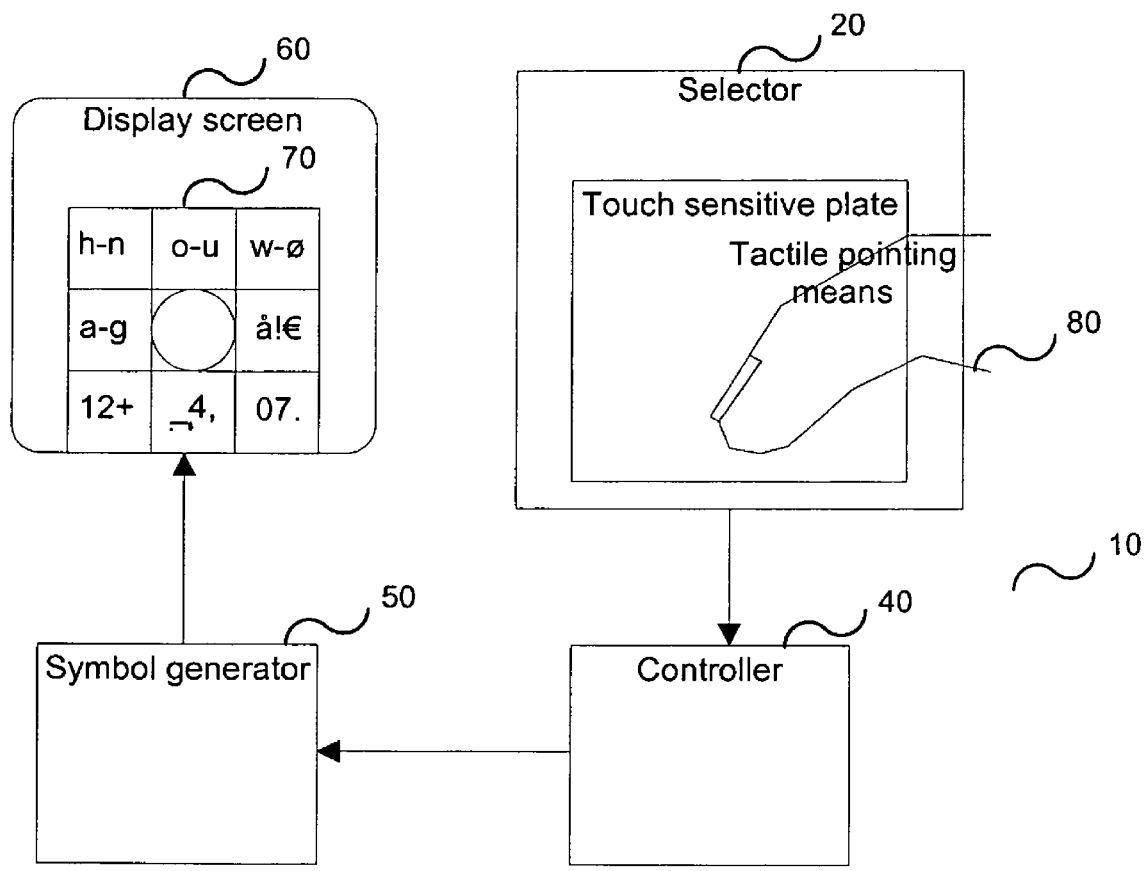
FIG. 1 shows a blocked schematic of a first embodiment of the present invention.

FIG. 1 shows a blocked schematic of an input device or a user interface 10 according to the present invention. The input device 10 comprises a display screen 60, and a symbol generator 50 for displaying a first set of graphical symbols 70 in an arrangement, in this embodiment a 3 by 3 matrix arrangement, on the display screen 60. It has been found that a 3 by 3 matrix arrangement provides a clear display of options that is well-suited for the display screen of a portable or mobile phone. Each of the selectable graphical symbols 70 is displayed in a distinct field that is graphically distinguished from its surroundings by means of a boundary forming a rectangle.

The input device 10 further comprises a selector 20 for selection of a symbol among symbols 70 displayed on the display screen 60. The selector 20 comprises a moveable cursor (not shown) that is displayed on the display screen, and a touch sensitive plate for manually controlling the position of the cursor on the display screen. The touch sensitive plate may for example be mounted at the back of communication equipment, e.g. at the back of a mobile phone. A tactile pointing means 80, such as simply a finger 80 as indicated in FIG. 1, touching and/or lightly pressing against the touch sensitive plate is used to move the cursor on the display screen 60 by moving the finger in the direction of desired cursor movement. When the cursor is positioned within the boundary of a specific symbol to be selected for input to the apparatus, that symbol may be selected, e.g., simply by stopping touching the plate, or by increasing the pressure against the touch sensitive plate.

The input device 10 further comprises a controller 40 that is operatively connected to the symbol generator 50 and the selector 20. As further described below with reference to FIGS. 2-4c, the controller 40 is adapted to control the symbol generator 50 to display a second set of graphical symbols in response to a selection of a symbol 70 from the first set of graphical symbols. Such a selection is performed simply by positioning of the cursor within the boundaries of the respective fields. in the present example, a symbol 70 may be selected by moving the cursor outside the boundaries of an octagon surrounding the present field before the said selection is enabled. Hereby, especially selection of fields positioned at the corners of the 3 by 3 matrix is facilitated.

In the illustrated embodiment some of the symbols 70 of the first set of symbols indicates a first set of alphabetic characters in alphabetic order, i.e. h-n, o-u, w-ø, a-g. The second set of graphical symbols displayed in response to the selection of one of these symbols comprises graphical symbols corresponding to the characters of the selected first set of alphabetic characters.

Figure 2:
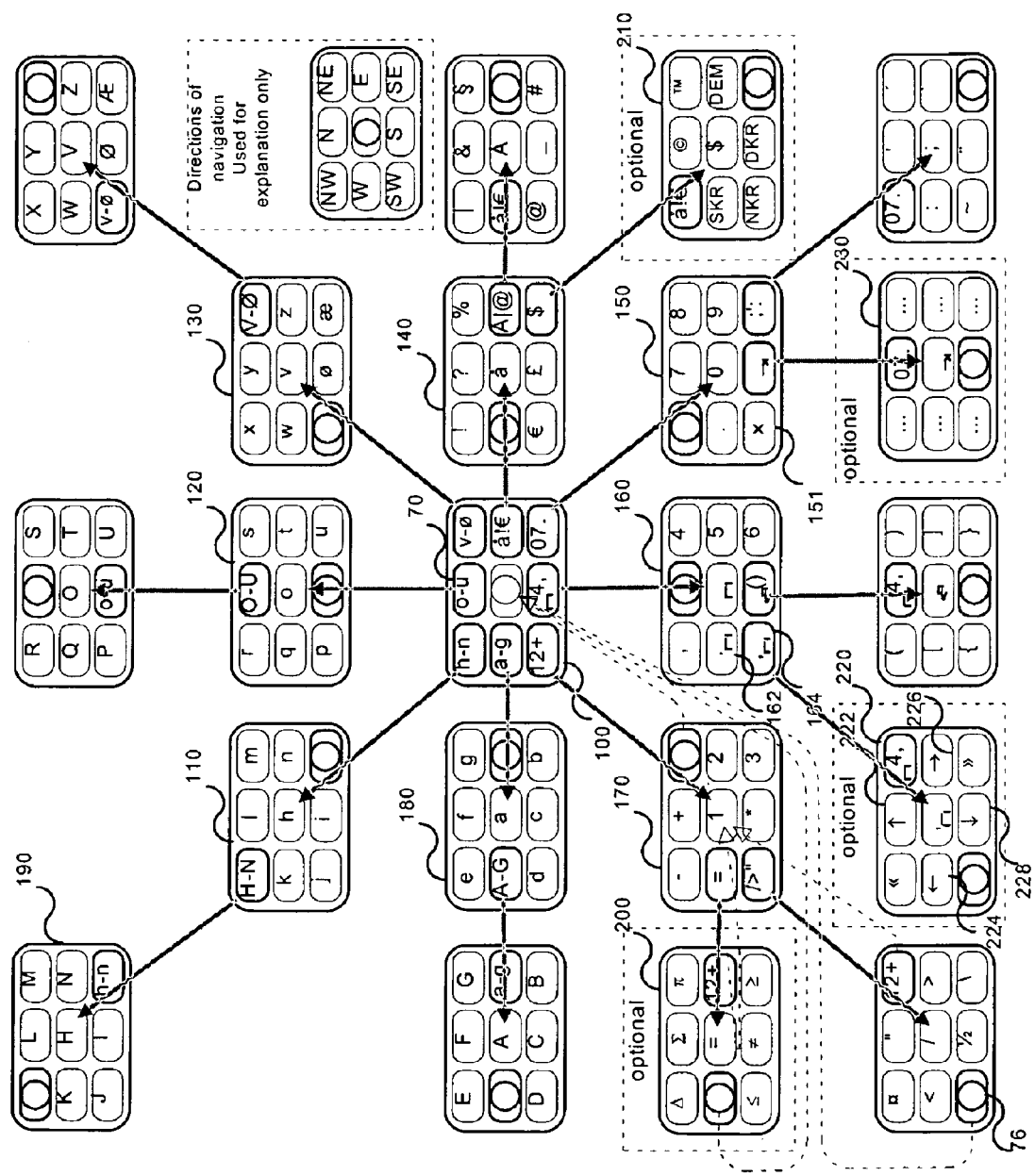
FIG. 2 illustrates the operation of the first embodiment of the present invention.

FIG. 2 illustrates the operation of the first embodiment of the invention wherein selectable graphical symbols 70 are displayed in a 3 by 3 matrix 100. FIG. 2 illustrates selection of characters typically provided on a standard Danish keyboard which is similar to an English keyboard with addition of the three national characters "æ", "ø", and "å" in both lower case and upper case versions.

The start-up image 100 displayed on the display screen 60 is shown at the centre of FIG. 2 and contains a first set of graphical symbols 70 in a 3 by 3 matrix arrangement. As indicated in FIG. 2, it is possible to select any alphabetic character, the digits 0-9, and 25 various other keyboard symbols, such as ".", ",", ";", space, etc. The eight second display images 110-180 shown adjacent to and surrounding the start-up display image 100 are images that are displayed on the display screen 60 upon selection of the corresponding symbols 70 in display image 100 as indicated by the corresponding lines connecting display image 100 and respective second display images 110-180. The eight second display images 110-180 contain the respective second sets of graphical symbols to be displayed in response to a selection of the corresponding symbol from the first set of symbols 100.

For example, if the symbol "h-n" is selected, the second image 110 immediately above and to the left of the centre image 100 will be displayed, wherein each of the characters h, i, j, k, l, m, and n is displayed in a separate field for individual selection. When the new image 110 is displayed, the cursor is automatically repositioned to the centre of the image, i.e. in this example the cursor is re-positioned at "h". If it is desired to select the letter "j", the cursor is moved down to "j" and the symbol "j" is selected, e.g., simply by stop touching the plate as previously described.

It should be noted that each of the second sets of graphical symbols displayed in second display images 110, 120, 130, and 180 contains a symbol that is a case shifted version of the first set of alphabetic characters of the selected first symbol. For example in second display image 110, one of the displayed fields contains a symbol "H-N" for selection of the previously selected characters in upper case. The symbol "H-N" is positioned at the same relative position in the displayed image as the previously selected symbol "h-n" so that the upper case characters can be selected by continuing the movement of the cursor in the same direction as the previous direction of cursor movement that lead to the actual symbol selection. Thus, to select capital "J", the cursor is moved from its centre position in image 100 "north-west" to the symbol "h-n" and the symbol "h-n" is selected. In the new 20 second displayed image 110, the cursor is moved further "north-west" to the symbol "H-N" that is selected, and in the third display image 190, the cursor is moved "south-west" to the symbol "J" that is selected.

In a first mode of operation, the start-up image 100 is displayed with the cursor automatically re-positioned at the centre of the start-up image 100 ready for selection of the next desired character upon selection of an individual character, such as "A", "=", "£", etc., or the selection of a combination of characters, such as ". (space)" 162, or ", (space)" 164.

It should be noted that a previously displayed image may be displayed again by moving the cursor in the opposite direction of the previous cursor movement. For example in 30 second display image 110, moving the cursor from its centre position at the symbol "h" to the north-west symbol "H-N" and selecting this symbol results in the display of third display image 190. Moving the cursor back in direction south-east from symbol "H" to symbol "h-n" and selecting this symbol results in the re-display of second display image 110. This allows the user to browse the symbols available for selection without performing a selection. Similarly, if the input actuators are constituted by keyboard keys, a previously displayed image may be selected by actuation of a key that is a mirror of the previously actuated key with respect to a centre of the keyboard. For example, in a 3 by 3 keyboard, if an image is displayed upon actuation of the north-west key, the previously displayed image may be displayed again by actuation of the south-east key.

Selection of symbol 76 results in display of image 100. It should be noted that symbol 76 is positioned so that three successive movements of the cursor in the same direction from image 100 results in re-display of image 100 without a selection of a character. Similarly, if the input actuators are constituted by keyboard keys, three consecutive actuations of the same key may result in re-display of image 100.

The selected characters may be appended in a character string, e.g. for transmission as a SMS message. The character string may be showed in a separate area of the display 60, or in the same display area of the display 60 where the first set of graphical symbols 70 is shown. The character string may be scrolled by selection of corresponding scroll symbols from one of the displayed set of graphical symbols 220. To delete a character that has been appended to the character string, the backspace symbol 151 of image 150 may be selected. Further, an edit cursor may be displayed within the displayed character string to allow editing of the character string, and input actuators 222, 224, 226, 228 may be provided for movement of the edit cursor.

It should be noted that the input device may be adapted to display any desired number of selectable graphical symbols by adapting the system to display further new images with new sets of symbols upon selection of displayed symbols of the currently displayed image that have previously been described to lead to selection of an input to the apparatus. For example in FIG. 2 four optional third display images 200, 210, 220, 230 are shown. Further (not shown in FIG. 2), selection of specific symbols displayed in a third display image may lead to display of a fourth display image with a fourth set of selectable graphical symbols, etc.

The input device may operate in a second mode of operation that is different from the first mode described previously. For example, upon selection of one of the edit cursor arrows 222, 224, 226, 228 displayed in third display image 220 for navigation of the edit cursor within the text string being input to the apparatus, the third display image 220 is displayed until the desired edit cursor position is obtained by sequential selections of the appropriate arrow symbols 222, 224, 226, 228 and the apparatus returns to the first mode upon selection of the symbol 76 and the start-up image 100 is displayed.

In an alternative embodiment of the present invention, the movement of the edit cursor may be controlled with a small keyboard with 8 separate logic keys for moving the edit cursor one step to the "east", "south-east", "south", "south-west", "west", "north-west", "north", and "north-east" in the matrix arrangement, or the keyboard may contain a single key with 8 pressure sensitive regions for individual selection of the desired direction of edit cursor movement.

Figure 3:
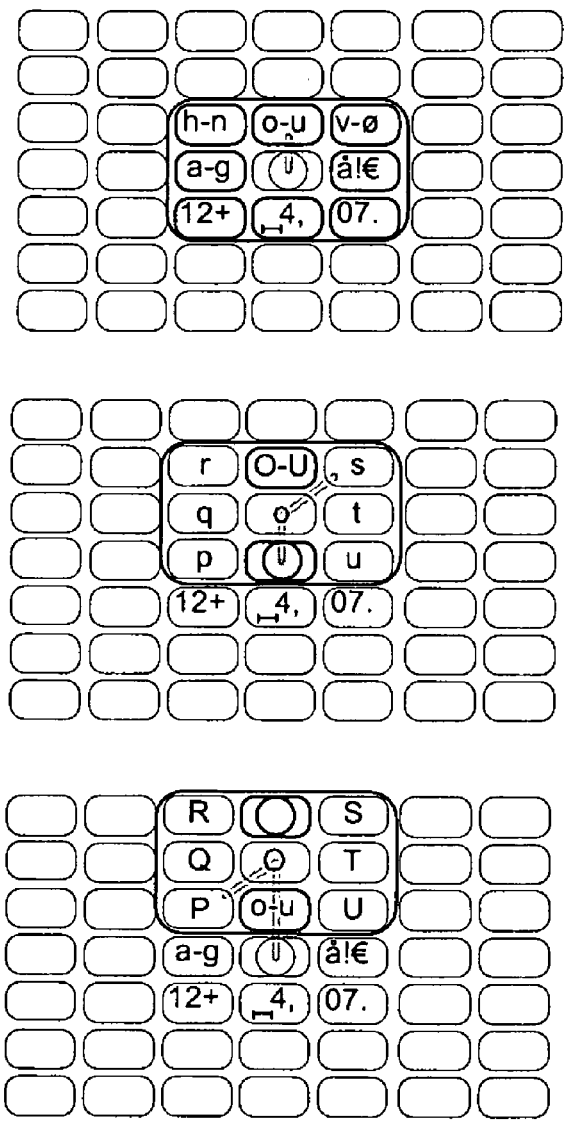
FIG. 3 illustrates how signs of selected characters are drawn by cursor movement.

In FIG. 3 character selection is illustrated in another way to more clearly show how selected characters are drawn by movement of the cursor. It is shown that a specific symbol, such as "s", and "P", is selected by drawing a graphical sign constituted by two linear segments with the cursor. Thus, a user may enter words and numbers by drawing simple signs constituted by one or two linear segments on the input device. This will enable the user to quickly learn how to enter specific symbols without referring to the displayed symbols whereby an extremely efficient and easy to learn user interface is provided.

It should be noted that repeated drawing of a graphical sign selects the same character, regardless of the starting point for the movement on the display screen.

Figure 4A:
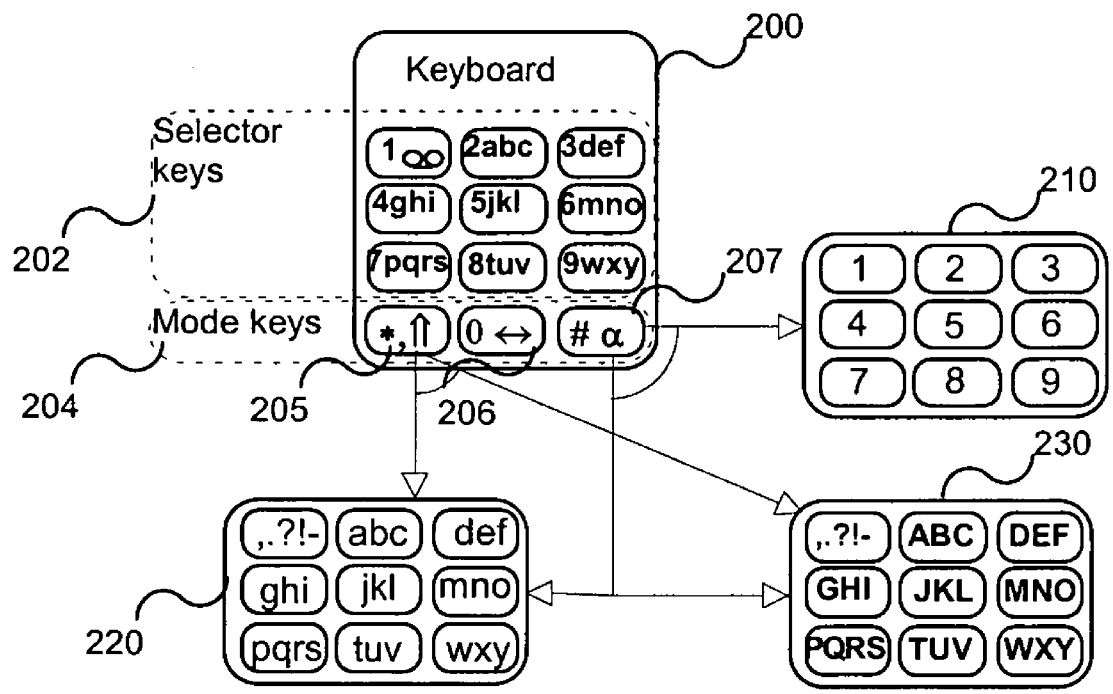
FIGS. 4*a*-4*c* illustrate the operation of a second embodiment of the present invention.

FIG. 4a illustrates the operation of another apparatus according to the invention with a selector 200 that includes a 3 by 3 keyboard 202 of the type typically provided with a telephone, such as a mobile phone. The selector 200 further includes three keys 205, 206, 207 designated mode keys 204. Selected characters are appended to a string of characters that is displayed in a specific area of the display screen of the apparatus.

Selectable graphical symbols are displayed in 3 by 3 matrices as indicated in frames 210, 220, and 230. Upon initiation of the apparatus, frame 220 is displayed on the display of the apparatus. Activation of mode key 205 toggles the display between frame 220 and 230, and activation of mode key 207 toggles the display between frame 210 and actual frame 220 or 230.

When frame 210 is displayed, one of the digits 1-9 may be selected by pressing the corresponding one of the selector keys 202. Pressing key 206 results in selection of digit 0.

When frame 220 or 230 is displayed, key 206 acts as a space key.

Figure 4B:
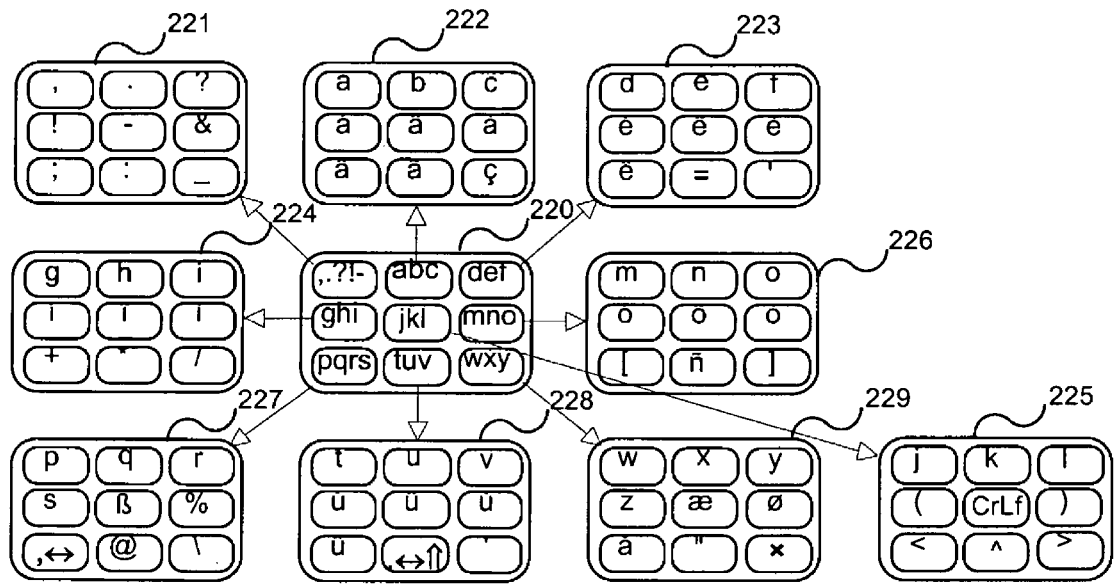

The possible character selections when frame 220 is displayed are illustrated in FIG. 4b, frames 221-229. For example, if key "5jkl" is pressed, frame 225 is displayed and thus, pressing key "6mno" leads to selection of the character ")".

It should be noted that control characters are included in the set of selectable characters, e.g. pressing key "5jkl" twice when frame 220, or 230, is displayed results in selection of control characters "carriage return" and "line feed".

It is also possible to select a string of characters. For example, pressing key "8tuv" twice when frame 220 is displayed results in selection of a character string consisting of ".", "space", and "upper case". This string is intended for selection at the end of a sentence since a "." is often followed by a space and the first letter of the next sentence starts with a capital character.

Figure 4C:
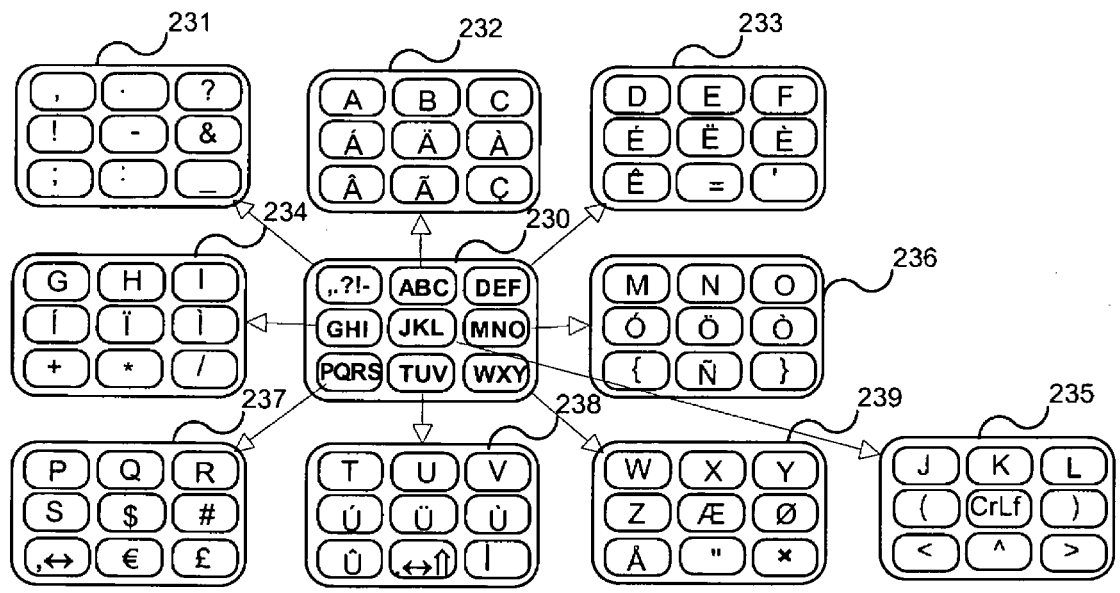

The possible character selections when frame 230 is displayed are illustrated in FIG. 4c in frames 231-239. For example, if key "2abc" is pressed, frame 232 is displayed and thus, pressing key "3def" leads to selection of the character "C".

The invention claimed is:

1. An apparatus comprising:
   a display screen;
   a symbol generator that generates for display on the display screen a set of first graphical symbols in a 3 by 3 matrix arrangement;
      wherein at least one of the first graphical symbols indicates a first set of alphabetic characters in alphabetic order;
   a selector for selection of graphical symbols on the display screen, the selector including a movable cursor that is displayed on the display screen at the center of the 3 by 3 matrix arrangement; and
   a controller, connected to the symbol generator and the selector, that controls the symbol generator to display a set of second graphical symbols corresponding to one of the first graphical symbols by replacing the set of first graphical symbols in the 3 by 3 matrix arrangement with the set of second graphical symbols responsive to a graphical sign constituted by at least one line segment drawn on the display screen with the movable cursor from the center of the 3 by 3 matrix arrangement to one of the first graphical symbols, the at least one line segment is displayed on the display screen overlying the 3 by 3 matrix arrangement;
      wherein the movable cursor is repositioned to the center of the 3 by 3 matrix arrangement after replacing the set of first graphical symbols in the 3 by 3 matrix arrangement with the set of second graphical symbols.

2. The apparatus according to claim 1, wherein the selector further comprises a keyboard with keys constituting input actuators also for selection of graphical symbols on the display screen.

3. The apparatus according to claim 2, further comprising a sound generator for generation of a specific sound upon actuation of a corresponding input actuator.

4. The apparatus according to claim 2, wherein the selector comprises a number of keys corresponding to the input actuators, and actuation of a specific key corresponds to actuation of the corresponding input actuator, wherein said keys are positioned on a surface of the apparatus opposite the display screen.

5. The apparatus according to claim 2, further comprising an input actuator for re-allocating the fields containing the first graphical symbols to respective input actuators.

6. The apparatus according to claim 2, wherein at least three consecutive actuations of one of the input actuators with associated fields containing first graphical symbols results in re-allocation of the fields containing the first graphical symbols to the respective input actuators.

7. The apparatus according to claim 2, wherein selection of an individual character results in re-allocation of the fields containing the first graphical symbols to the respective input actuators.

8. The apparatus according to claim 2, further comprising an input actuator for switching between a first graphical symbol and second graphical symbol in a field.

9. The apparatus according to claim 2, further comprising an input actuator with an associated field containing a string of characters for selection by actuation of the input actuator.

10. The apparatus according to claim 2, further comprising an input actuator with an associated field containing a string of control characters for selection by actuation of the input actuator.

11. The apparatus according to claim 1, wherein the selector comprises a touch sensitive device whereby the cursor is movable by tactile interaction with the touch sensitive device.

12. The apparatus according to claim 11, wherein the touch sensitive device is a touch sensitive display.

13. The apparatus according to claim 11, wherein a specific directional movement on the touch sensitive device is by a tactile pointer.

14. The apparatus according to claim 13, wherein the apparatus is a hand held apparatus, and the touch sensitive device is positioned on a surface of the apparatus opposite the display screen.

15. The apparatus according to claim 1, wherein at least one second graphical symbol of the set of second graphical symbols indicates a second set of alphabetic characters in alphabetic order, and wherein the controller further controls the symbol generator to display graphical symbols in fields corresponding to respective characters of the second set of alphabetic characters in response to selection of an associated field containing the at least one second graphical symbol.

16. The apparatus according to claim 15, wherein the second set of alphabetic characters is a case shifted version of the first set of alphabetic characters of a selected first graphical symbol.

17. The apparatus according to claim 16, wherein the second graphical symbol is displayed at a same relative position in the 3 by 3 matrix arrangement as the selected first graphical symbol.

18. The apparatus according to claim 1, wherein the selector further comprises a cursor controller for manually controlling a position of the movable cursor on the display screen, and a click actuator for selection of the graphical symbol at a current cursor position.

19. The apparatus according to claim 18, wherein the cursor controller comprises a key for movement of the movable cursor one step in a specific direction in the 3 by 3 matrix arrangement.

20. The apparatus according to claim 18, wherein the key has a plurality of pressure sensitive regions for individual selection of a desired direction of cursor movement.

21. The apparatus according to claim 18, further comprising eight selectable directions for moving the cursor one step to the "east", "south-east", "south", "south-west", "west", "north-west", "north", and "north-east" respectively in the 3 by 3 matrix arrangement.

22. The apparatus according to claim 18, wherein the movable cursor is shown as a line segment connecting a center point of the display screen and a current cursor position.

23. An apparatus comprising:
a display screen;
a symbol generator that generates for display on the display screen a set of first graphical symbols in a 3 by 3 matrix arrangement,
  wherein at least one of the first graphical symbols indicates a first set of alphabetic characters in alphabetic order;
a selector for selection of graphical symbols on the display screen, the selector including a movable cursor that is displayed on the display screen at the center of the 3 by 3 matrix arrangement; and
a controller, connected to the symbol generator and the selector, that controls the symbol generator to:
  display a set of second graphical symbols corresponding to one of the first graphical symbols by replacing the set of first graphical symbols in the 3 by 3 matrix arrangement with the set of second graphical symbols responsive to at least one line segment drawn on the display screen with the movable cursor from the center of the 3 by 3 matrix arrangement to one of the first graphical symbols;
    wherein the movable cursor is repositioned to the center of the 3 by 3 matrix arrangement after replacing the set of first graphical symbols in the 3 by 3 matrix arrangement with the set of second graphical symbols; and
  to subsequently redisplay the set of first graphical symbols in place of the set of second graphical symbols responsive to the at least one line segment traversed by the movable cursor from the center of the 3 by 3 matrix arrangement in a second direction opposite the first direction.

24. An apparatus comprising:
a display screen;
a symbol generator that generates for display on the display screen a 3 by 3 matrix arrangement of input actuators having a set of first graphical symbols displayed therein;
  wherein at least one of the first graphical symbols indicates a first set of alphabetic characters in alphabetic order;
a selector for selection of the input actuators on the display screen, the selector including a movable cursor that is displayed on the display screen at the center of the 3 by 3 matrix arrangement; and
a controller, connected to the symbol generator and the selector, that controls the symbol generator to display a set of second graphical symbols corresponding to one of the first graphical symbols by replacing the set of first graphical symbols in the 3 by 3 matrix arrangement of input actuators with the set of second graphical symbols responsive to a graphical sign constituted by at least one line segment drawn on the display screen with the movable cursor from the center of the 3 by 3 matrix arrangement to one of the first graphical symbols, the at least one line segment is displayed on the display screen overlying the 3 by 3 matrix arrangement;
wherein the movable cursor is repositioned to the center of the 3 by 3 matrix arrangement after replacing the set of first graphical symbols in the 3 by 3 matrix arrangement with the set of second graphical symbols.

* * * * *